US010387304B2

(12) United States Patent
Li (10) Patent No.: US 10,387,304 B2
(45) Date of Patent: Aug. 20, 2019

(54) VIRTUAL TRANSFER OF DATA BETWEEN MEMORY AND STORAGE DOMAINS

(71) Applicant: Intel Corporation, Santa Clara, CA (US)

(72) Inventor: Ang Li, Coquitlam (CA)

(73) Assignee: Intel Corporation, Santa Clara, CA (US)

( * ) Notice: Subject to any disclaimer, the term of this patent is extended or adjusted under 35 U.S.C. 154(b) by 9 days.

(21) Appl. No.: 15/857,352

(22) Filed: Dec. 28, 2017

(65) Prior Publication Data

US 2019/0042465 A1 Feb. 7, 2019

(51) Int. Cl.
*G06F 12/00* (2006.01)
*G06F 12/02* (2006.01)
*G06F 12/1027* (2016.01)
*G06F 12/1081* (2016.01)
*G06F 12/1009* (2016.01)

(52) U.S. Cl.
CPC ...... *G06F 12/0246* (2013.01); *G06F 12/0238* (2013.01); *G06F 12/1009* (2013.01); *G06F 12/1027* (2013.01); *G06F 12/1081* (2013.01); *G06F 2212/202* (2013.01); *G06F 2212/214* (2013.01)

(58) Field of Classification Search
None
See application file for complete search history.

(56) References Cited

U.S. PATENT DOCUMENTS

2013/0046920 A1* 2/2013 Ryu ............... G06F 12/0246
711/103
2014/0129767 A1* 5/2014 Ramanujan ......... G06F 12/0897
711/105
2014/0359203 A1* 12/2014 Tipton .............. G06F 3/0619
711/103

* cited by examiner

*Primary Examiner* — Daniel D Tsui
(74) *Attorney, Agent, or Firm* — Thorpe North & Western, LLP (57) ABSTRACT

Devices, systems, and methods for transferring data between the memory domain and the storage domain are described. Transferring data between domains can comprise changing the validity of the block address of the data from one domain to the other, and updating a memory domain map and a storage domain map to reflect the transfer.

25 Claims, 6 Drawing Sheets

| n-1:m+1 | m:1 | 0, 1 |
|---|---|---|
| NVM Logical Block Address (LBA) | Logical Block Offset | DA Bit |

VIRTUAL TRANSFER OF DATA BETWEEN MEMORY AND STORAGE DOMAINS

BACKGROUND

Memory subsystems can be a significant performance bottleneck to achieving the performance potential of a computing system. While one solution to this bottleneck would be to use primarily only very fast memory in a computer system, such as static random-access memory, the cost of such memory renders this potential solution prohibitive. In order to balance cost with system performance, memory subsystem architecture is typically organized in a hierarchical structure, with faster expensive memory operating near the processor at the top, slower less expensive memory operating as storage memory at the bottom, and memory having an intermediate speed and cost, operating in the middle as system memory.

Recent developments in persistent memory technology have begun to erode the performance distinction between the intermediate system memory tier and the bottom storage memory tier. The hierarchical distinction between system memory and storage memory remains, however, due to traditional memory subsystem architecture.

DESCRIPTION OF EMBODIMENTS

Although the following detailed description contains many specifics for the purpose of illustration, a person of ordinary skill in the art will appreciate that many variations and alterations to the following details can be made and are considered included herein. Accordingly, the following embodiments are set forth without any loss of generality to, and without imposing limitations upon, any claims set forth. It is also to be understood that the terminology used herein is for describing particular embodiments only, and is not intended to be limiting. Unless defined otherwise, all technical and scientific terms used herein have the same meaning as commonly understood by one of ordinary skill in the art to which this disclosure belongs. Also, the same reference numerals in appearing in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various embodiments. One skilled in the relevant art will recognize, however, that such detailed embodiments do not limit the overall concepts articulated herein, but are merely representative thereof. One skilled in the relevant art will also recognize that the technology can be practiced without one or more of the specific details, or with other methods, components, layouts, etc. In other instances, well-known structures, materials, or operations may not be shown or described in detail to avoid obscuring aspects of the disclosure.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open-ended term in this written description, like "comprising" or "including," it is understood that direct support should be afforded also to "consisting essentially of" language as well as "consisting of" language as if stated explicitly and vice versa.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of phrases including "an example" or "an embodiment" in various places throughout this specification are not necessarily all referring to the same example or embodiment.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

An initial overview of embodiments is provided below, and specific embodiments are then described in further detail. This initial summary is intended to aid readers in understanding the disclosure more quickly, but is not intended to identify key or essential technological features, nor is it intended to limit the scope of the claimed subject matter.

Figure 1A:
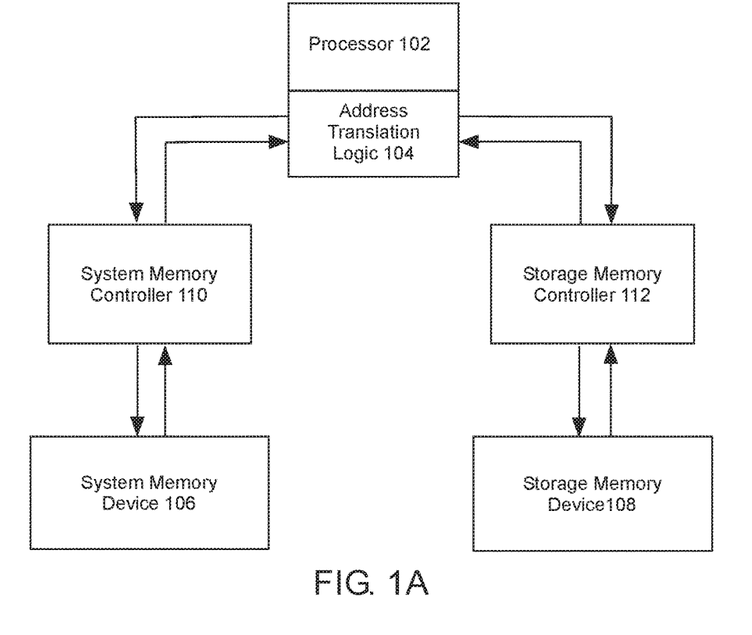
FIG. 1A illustrates a block diagram of a traditional memory subsystem.

The performance needs of computational devices and systems are continually increasing, and memory design and utilization can be key factors in achieving increased performance. In a typical computing system, a processor operates on data that is generally stored along a memory hierarchy from processor cache to system memory to storage memory. Due to the smaller capacity of system memory compared to storage memory, data is maintained in system memory based on priority, which results in data blocks being transferred to and from storage memory as data priority changes. System memory and storage memory traditionally require different types of memory media, and thus data blocks are sent from a memory device containing the system memory to a storage device containing the storage memory and vice versa. A simplified example of such a traditional system is shown in FIG. 1A, which includes a processor 102, such as a central processing unit (CPU), address translation logic 104, a system memory device 106, and a storage memory device 108. A system memory controller 110 is coupled between the address translation logic 104 and the system memory device 106, which controls data movement therebetween. A storage memory controller 112 is coupled between the address translation logic 104 and the storage memory device 108, which to controls data movement therebetween. As such, when a request to move data from the system memory device 106 to the storage memory device 108 is sent from the processor 102 through the address translation logic 104, the data is read from the system memory device 106 by the system memory controller 110 and sent to the storage memory controller 112, which writes the data to the appropriate location in the storage memory device 108. Similarly, when a request to move data from the storage memory device 108 to the system memory device 106 is sent from the processor 102 through the address translation logic 104, the data is read from the storage memory device 108 by the storage memory controller 112 and sent to the system memory controller 110, which writes the data to the appropriate location in the system memory device 106.

Volatile memory has been traditionally used for system memory, and nonvolatile memory (NVM) has traditionally been used for storage memory. NVM is a persistent storage medium, or in other words, a storage medium that does not require power to maintain the state of data stored therein, while data stored in volatile memory is lost when power is interrupted. New and evolving memory technologies, however, allow NVM to be used in roles that extend beyond traditional storage memory, and into such as roles system memory. Nonvolatile system memory (NVMsys) has many advantages over traditional volatile memory, such as high density, large capacity, lower power consumption, and reduced manufacturing complexity, to name a few. Byte-addressable, write-in-place NVM such as three-dimensional (3D) cross-point memory, for example, can operate as byte-addressable memory similar to dynamic random-access memory (DRAM) or as block-addressable memory similar to NAND. In other words, such NVM can operate as system memory or as nonvolatile storage memory (NVMstor). In some situations where NVM is functioning as NVMsys, stored data can be discarded or otherwise rendered unreadable when power to the NVMsys is interrupted, and thus would not technically be considered "persistent" in such cases.

Figure 1B:
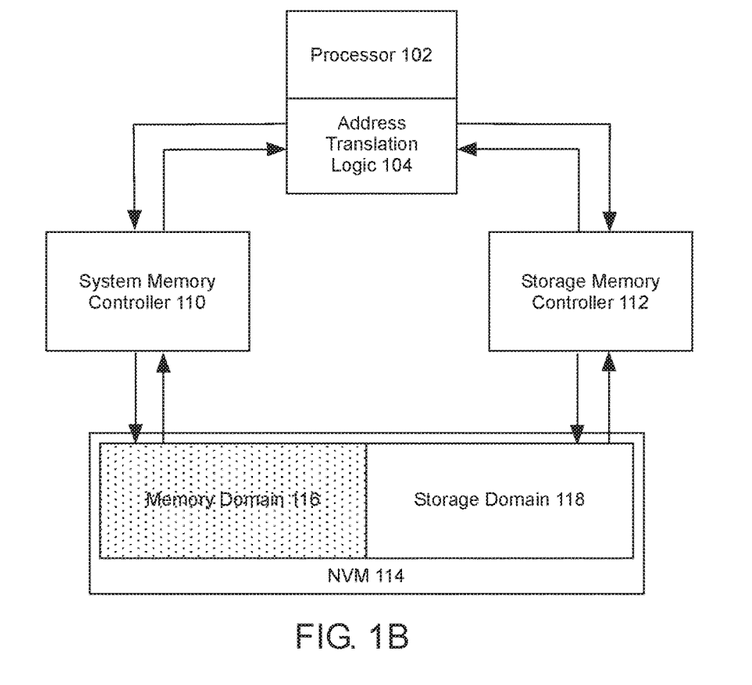
FIG. 1B illustrates a block diagram of a traditional memory subsystem.

When NVM is used as both system memory and storage memory in a system, system memory data and storage memory data can be resident on the same memory medium. One example of such a configuration is shown in FIG. 1B, where the system memory and storage memory are stored on NVM 114. Due to traditional computing system architecture, however, the NVM 114 is partitioned or otherwise divided into a memory domain 116 and a storage domain 118, thus physically separating the system memory data from the storage memory data. Due to this separation, the movement of data from one domain to the other is still accomplished in such traditional systems by physically moving the data from one location to another, as is described for FIG. 1A. Such movement of data from one physical location to another physical location on the same medium expends energy, reduces memory system performance, and increases wear of the medium unnecessarily, to name a few.

Traditional memory and storage domains are established, at least in part, by the physical division between the separate devices upon which each domain is stored. In order to move from one domain to the other, data is physically transferred between devices or partitions, and the address mapping for that data is updated in, for example, the address translation logic 104. In other words, the physical location of the data defined the domain of the data, either memory or storage.

The present disclosure provides a novel technology for managing NVMsys data and NVMstor data that transfers data between the memory domain and the storage domain without altering the physical location of the data, or in other words, without physically moving the data. This is accomplished, in one example, by maintaining a map of the NVM block addresses that are in each of the memory and storage domains (i.e., a domain map), and thus data located in a given NVM block address is in the domain to which that address is mapped. Each NVM block address includes an associated domain attribute, which is updated to account for the "movement" of data at that address between domains. In other words, each NVM block address has an associated domain attribute that signifies whether the NVM block address includes data that is valid in the memory domain or in the storage domain. The data is transferred from one domain to the other by switching the domain attribute to the proper domain, which updates the domain map to reflect the data transfer while leaving the data in the same physical NVM location. Thus, for a request to transfer data from memory to storage, for example, the domain attribute associated with the NVMsys block address of the data is switched from "memory domain" to "storage domain," the domain map is updated to reflect the transfer, and the data is now NVMstor valid in the storage domain without having been physically moved.

Figure 2:
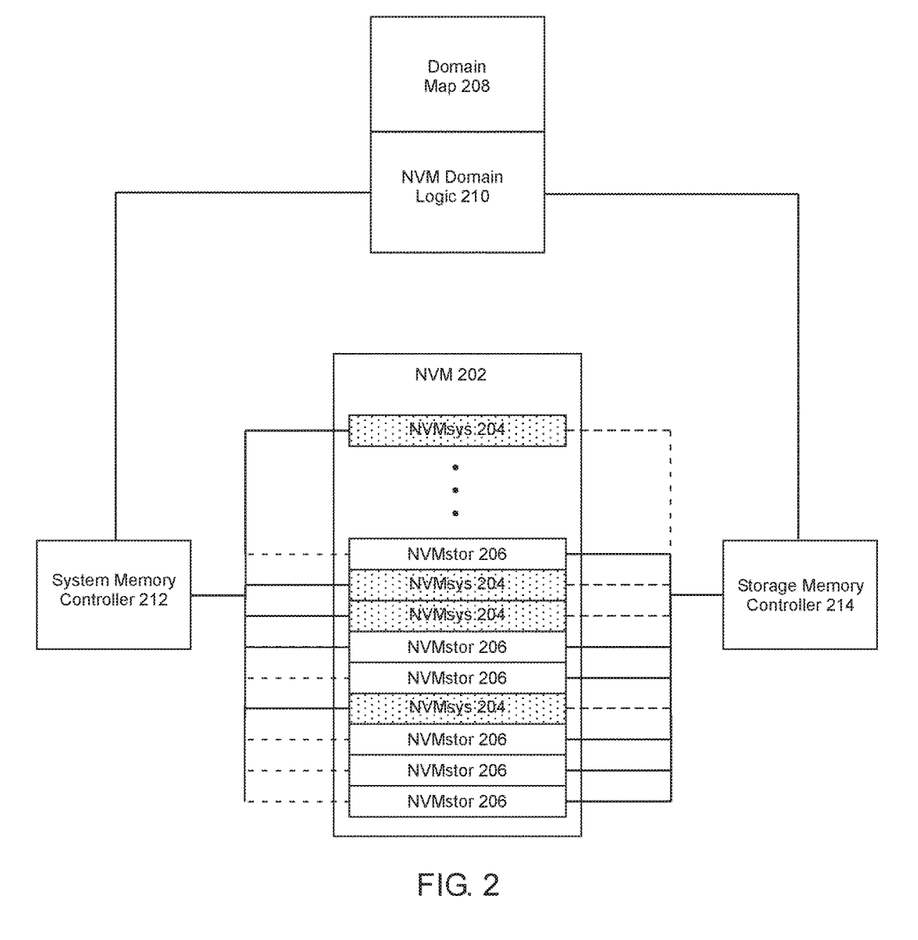
FIG. 2 illustrates a block diagram of a memory subsystem in accordance with an example embodiment.

FIG. 2 shows a general example of a memory device or subsystem that comprises a NVM 202, including NVM block addresses divided into a set of NVMsys 204 block addresses that are valid in the memory domain, and a set of NVMstor 206 block addresses that are valid in the storage domain. For the purposes of the present disclosure, the term "NVM block address" is used to describe an address generally, regardless of the domain in which the address is valid, while the terms "NVMsys" and "NVMstor" are used to describe the address in terms of the domain in which that address is valid. At least a portion of the set of NVMsys 204 block addresses are mapped to a system address space, and are thus visible to the operating system (OS). The size or granularity of the NVM block addresses can be established according to the architecture of the system in which the memory device or subsystem is used, and can thus be of any useful granularity that is system-compatible. In one example, each NVM block address is a page frame or an addressable portion of a page frame. The memory device additionally includes a domain map 208 that can be a data structure to maintain the set of NVMsys 204 block addresses making up the memory domain, and the set of NVMstor 206 block addresses making up the storage domain. As such, the memory domain is the mapping of NVMsys 204 block addresses in the NVM 202, and NVMsys 204 block addresses are thus valid in the memory domain. Similarly, the storage domain is the mapping of NVMstor 206 block addresses in the NVM 202, and NVMstor 206 block addresses are thus valid in the storage domain.

A NVM domain logic 210 is functionally coupled to the domain map 208, which maintains the mapping of the NVM block addresses to the respective domains. In one example, as described above, each NVM block address is associated with a domain attribute that identifies the address as being either a NVMsys 204 block address in the memory domain or a NVMstor 206 block address in the storage domain. When a memory request is received to move data from one domain to the other, the NVM domain logic 210 switches the domain attribute of the data's NVM block address from its current domain to the other, and the NVM domain logic 210 updates the domain map 208 to reflect the transfer of the data between domains. While the data has not been physically moved, updating the domain map 208 to reflect the current domain attribute of an address alters the visibility of that address to the OS, thus effectively moving the data into and out of the system memory address space. Such movement of data between the memory and storage domains by merely altering the domain attribute of the NVM block address of the data can improve data transfer latency, decreases power consumption, decrease wear on the NVM media, reduce the data transfer load on the system, among others. Because the data has not been physically moved, transferred data does not require error correction to be performed as part of the data transfer. System efficiency can additionally be improved for at least some encrypted data systems, as the data is not put on the data bus as part of the transfer, therefore avoiding the need for an encryption/decryption process to secure the data during the transfer. Additionally, if data to be transferred from the memory domain to the storage domain has been marked as modified, or in other words, if the data's dirty bit has been set, the system can clear the dirty bit as part of the domain transfer because the memory domain "copy" of the data already contains the modification, and is already at the physical NVM location of the storage domain "copy."

As such, the NVM domain logic 210 can comprise circuitry to manage the domain map 208 of the set of NVMsys 204 block addresses valid in the memory domain and the set of NVMstor 206 block addresses valid in the storage domain. In response to receiving an instruction to move data from the memory domain to the storage domain, for example, the NVM domain logic 210 alters the NVMsys 204 block address associated with the data from valid in the memory domain to valid in the storage domain without physically moving the data. The NVM domain logic 210, in response to receiving a request to move data from the storage domain to the memory domain, alters the domain attribute associated with the NVMstor 206 block address from valid in the storage domain to valid in the memory domain, without physically moving the data.

Figure 4:
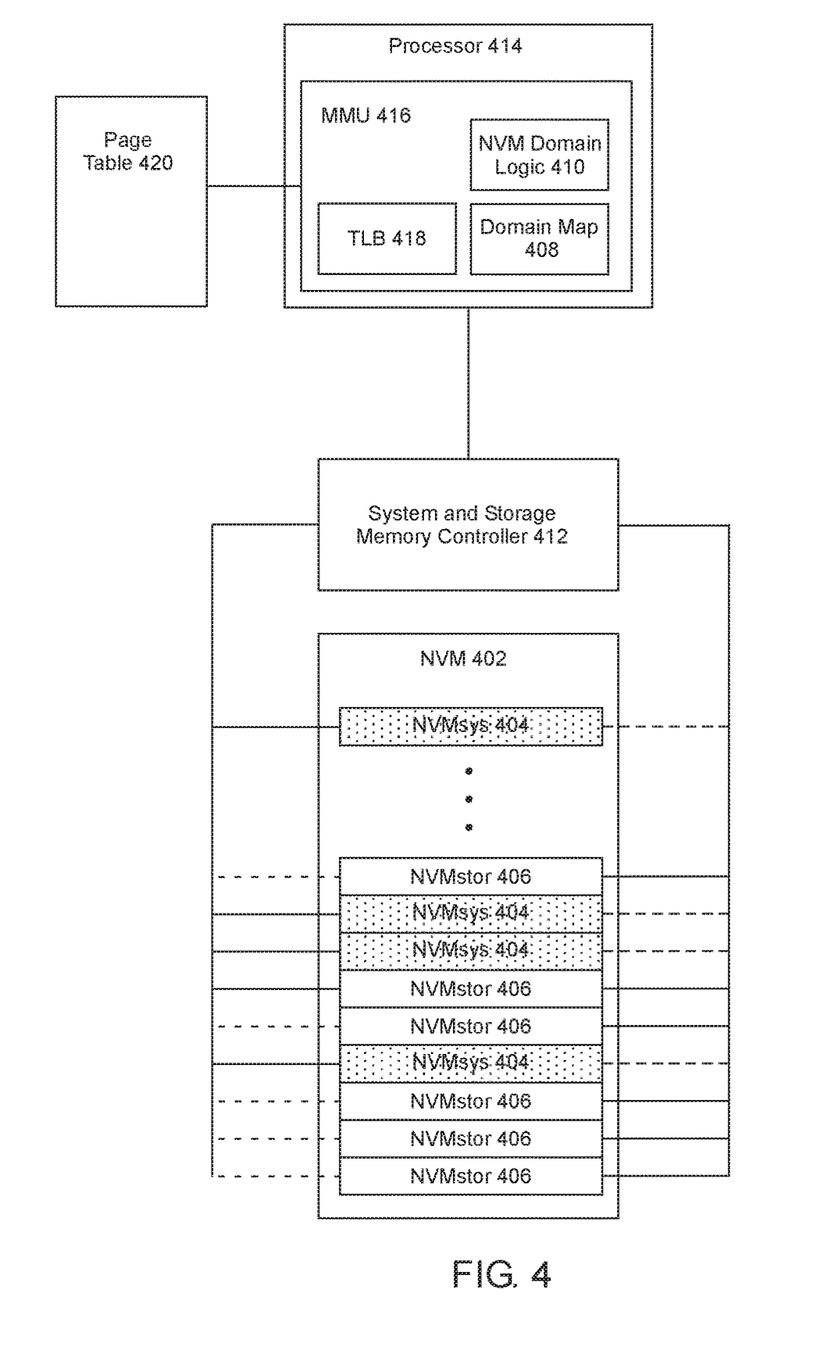
FIG. 4 illustrates a block diagram of a computing system in accordance with an example embodiment.

The memory device or subsystem exemplified in FIG. 2 further includes a system memory controller 212 and a storage memory controller 214, each coupled to the NVM 202. Each controller can include one or more controllers, and it is further contemplated that both system memory controller and storage memory controller functions can be integrated into a single controller, as is shown in FIG. 4, for example. It is noted that, in at least some examples, these memory controllers are not involved in the movement of data between the memory and storage domains, but instead are involved in other read/write operations performed on data in each of their respective domains. The system memory controller 212 controls system memory operations on NVMsys 204 data valid in the memory domain The system memory controller 212 can be any type of controller that performs memory operations on system memory, or NVMsys. For example, a read operation for a block of data to fill a read memory request from a host is performed on a NVMsys 204 block address in the memory domain by the system memory controller 212. Similarly, the storage memory controller 214 can be any type of controller that performs memory operations on storage memory, or NVMstor. For example, a read operation for a block of data to fill a read memory request from a host is performed on a NVMstor 206 block address in the storage domain by the storage memory controller 214. The system memory and storage memory controllers can independently be, for example, integrated on chip or on package with a host processor, within an uncore portion of a processor package, or in a structure or component separate from the processor package, such as, for example, a field programmable gate array (FPGA), an application-specific integrated circuit (ASIC), an input/output (I/O) hub, a Northbridge, or the like.

The solid lines in FIG. 2 between the system memory controller 212 and each of the NVMsys 204 block addresses represent memory domain-valid connections, and the plurality of NVMsys 204 block addresses collectively represent the memory domain of the NVM 202. The dashed lines between the system memory controller 212 and each of the NVMstor 206 block addresses represent inactive connections that are currently not valid in the memory domain. Similarly, the solid lines in FIG. 2 between the storage memory controller 214 and each of the NVMstor 206 block addresses represent storage domain-valid connections, and the plurality of NVMstor 206 block addresses collectively represent the storage domain of the NVM 202. The dashed lines between the storage memory controller 214 and each of the NVMsys 204 block addresses represent inactive connections that are currently not valid in the storage domain.

NVM can include any type of memory capable of storing system memory data and storage memory data together on the same memory medium. It is noted that "the same memory medium" can include a single common memory medium, a distributed set of memory media operating as a common memory medium, independent memory media having dedicated system and/or storage memory controllers, and the like. The present scope thus includes any architectural arrangement, distribution, or design of memory media, any addressing scheme, controller configuration and/or arrangement, and the like, provided the memory system is capable of mapping NVMsys and NVMstor block addresses across the memory media in a manner that allows the mapping to be altered to reflect the movement of data between the memory and storage domains without physically moving the data.

Regarding the types of NVM that can be utilized, non-limiting examples can include planar or three-dimensional (3D) NAND flash memory, including single or multi-threshold-level NAND flash memory, NOR flash memory, single or multi-level Phase Change Memory (PCM), such as chalcogenide glass PCM, planar or 3D PCM, cross-point array memory, including 3D cross-point memory, non-volatile dual in-line memory module (NVDIMM)-based memory, such as flash-based (NVDIMM-F) memory, flash/DRAM-based (NVDIMM-N) memory, persistent memory-based (NVDIMM-P) memory, 3D cross-point-based NVDIMM memory, resistive RAM (ReRAM), including metal-oxide- or oxygen vacancy-based ReRAM, such as $HfO_2$-, $Hf/HfO_x$-, $Ti/HfO_2$-, $TiO_x$-, and $TaO_x$-based ReRAM, filament-based ReRAM, such as $Ag/GeS_2$-, $ZrTe/Al_2O_3$-, and Ag-based ReRAM, programmable metallization cell (PMC) memory, such as conductive-bridging RAM (CBRAIVI), silicon-oxide-nitride-oxide-silicon (SONOS) memory, ferroelectric RAM (FeRAM), ferroelectric transistor RAM (Fe-TRAM), anti-ferroelectric memory, polymer memory (e.g., ferroelectric polymer memory), magnetoresistive RAM (MRAM), write-in-place non-volatile MRAM (NVM-RAM), spin-transfer torque (STT) memory, spin-orbit torque (SOT) memory, nanowire memory, electrically erasable programmable read-only memory (EEPROM), nanotube RAM (NRAM), other memristor- and thyristor-based memory, spintronic magnetic junction-based memory, magnetic tunneling junction (MTJ)-based memory, domain wall (DW)-based memory, and the like, including combinations thereof. The term "memory device" can refer to the die itself and/or to a packaged memory product. NVM can be byte or block addressable. In some examples, NVM can comply with one or more standards promulgated by the Joint Electron Device Engineering Council (JEDEC), such as JESD21-C, JESD218, JESD219, JESD220-1, JESD223B, JESD223-1, or other suitable standard (the JEDEC standards cited herein are available at www.jedec.org). In one specific example, the NVM is 3D cross-point memory. In another specific example, the NVM is 3D cross-point-based NVDIMM memory.

Figure 3:
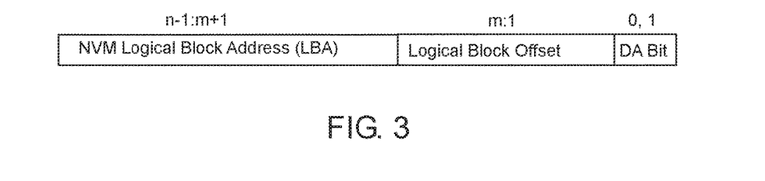
FIG. 3 illustrates a data structure for a nonvolatile memory block address entry of a domain map in accordance with an example embodiment.

FIG. 3 shows one nonlimiting example of a data structure for a NVM block address entry in the domain map. The NVM block address entries for the NVM block addresses in the NVM are used to facilitate the creation and maintenance of the memory domain map of the NVMsys block addresses and the storage domain map of the NVMstor block addresses. For example, each NVM block address in the NVM can be associated with a domain map entry in the domain map that includes a NVM block address, such as a NVM logical block address (LBA), a logical block offset, and a domain attribute bit (DA bit in FIG. 3). The NVM LBA field holds the address for the frame where the NVM block address is located, and the logical block offset holds the offset from the frame address to the data associated with the NVM block address. n represents the entry width, and m represents the LBA size. The DA bit is a switchable bit that identifies the NVM block address associated with the entry as being in either the memory domain or the storage domain. In one example, the NVM block address is valid in the memory domain when the DA bit is set, and is valid in the storage domain when the DA bit is clear. In an alternative example, the NVM block address is valid in the storage domain when the DA bit is set, and is valid in the memory domain when the DA bit is clear. While this example is described in terms of LBA addressing, it should be understood that such is not limiting, and other addressing schemes are considered to be included in the present scope.

FIG. 4 shows a general example of a computing system that comprises a NVM 402, including NVM block addresses divided into a set of NVMsys 404 block addresses that are valid in the memory domain, and a set of NVMstor 406 block addresses that are valid in the storage domain. The set of NVMsys 404 block addresses are mapped to a system address space, and are thus visible to the OS. The computing system further includes a combined system and storage memory controller 412 coupled to the NVM 402. The combined system and storage memory controller 412 can include one or more combined controllers, and it is further contemplated that the system memory and the storage memory controller functions can be embodied in separate controllers, as is shown in FIG. 2, for example. It is noted that, in at least some examples, the combined system and storage memory controller 412 is not involved in the movement of data between the to memory and storage domains, but instead is involved in other read/write operations performed on data in each domain. The solid lines in FIG. 4 between the combined system and storage memory controller 412 and each of the NVMsys 404 and NVMstor 406 block addresses represent valid connections for each respective domain, and the dashed lines represent inactive connections for each respective domain.

The computing system further includes processor 414 communicatively coupled to system and storage memory controller 412, which can include a single processor or multiple processors, including single core processors and multi-core processors. Processor 414 can also include any processor type or configuration, nonlimiting examples of which can include microprocessors, embedded processors, central processing units (CPUs), digital signal processors (DSPs), field programmable gate arrays (FPGAs), network processors, hand-held or mobile processors, application-specific processors, co-processors, and the like. Processor 414 can be packaged in numerous configurations, nonlimiting examples of which can include a common processor package, a multi-core processor package, a system-on-chip (SoC), a system-in-package (SiP), a system-on-package (SOP), and the like.

The computing system further includes memory management unit (MMU) 416, which can be implemented as part of processor 414, as a separate integrated circuit, or the like. The MMU 416 includes a NVM domain logic 410 that can generate a domain map 408, which is a data structure to maintain the set of NVMsys 404 block addresses making up the memory domain, and the set of NVMstor 406 block addresses making up the storage domain. As such, the memory domain is the mapping of NVMsys 404 block addresses in the NVM 402, and NVMsys 404 block addresses are thus valid in the memory domain. Similarly, the storage domain is the mapping of NVMstor 406 block addresses in the NVM 402, and all NVMstor 406 block addresses are thus valid in the storage domain. The NVM domain logic 410 can additionally maintain the domain map 408. In one example, as described above, each NVM block address is associated with a domain attribute that identifies the address as being either a NVMsys 204 block address in the memory domain or a NVMstor 206 block address in the storage domain. As the data associated with the addresses are transferred back and forth between system memory and storage memory, the domain attribute for each NVM block address is altered accordingly, and NVM domain logic 410 can update the domain map 408 to reflect these domain attribute changes. The domain map 408 can reside in any useful location or structure, which is not seen to be limiting. As one example, the domain map 408 can reside at least partially in the MMU 416, such as in a memory array, registers, or the like. In another example, the domain map 408 can reside in the NVM 402 (e.g., in NVMsys) or in other system memory of the computing system.

MMU 416 further includes translation lookaside buffer (TLB) 418, and is communicatively coupled to page table 420. MMU 416 supports virtual memory by translating virtual addresses to physical addresses. Upon receiving a memory request, MMU 416 converts the virtual address associated with the memory request to the physical address of the associated data. In some examples, MMU 416 divides the virtual address space, which is the range of addresses used by processor 414, into virtual pages, with each virtual page having a virtual address. Page table 420 includes a page table entry (PTE) for each virtual page, which includes the virtual address mapped to a corresponding physical address in physical memory, including the relevant offset. Searching the page table 420 for each memory request can have a significant negative impact on the performance of a system, and the TLB 418 is used to minimize page table lookups. The TLB 418 is a memory structure that caches a subset of PTEs from page table 420 to speed address translation and permissions checking. In other words, TLB 418 is an associative cache of a subset of PTEs to avoid a lookup of page table 420 for every memory request.

Upon receiving a memory request, MMU 416 performs a lookup of TLB 418 for the associated virtual-to-physical address translation information. If the requested translation information is in TLB 418, the system can translate the virtual address to the physical address without requiring a page table 420 lookup. If the translation information is not found in TLB 418, or in other words, the lookup returns a TLB miss, MMU 416 searches page table 420 for the associated translation information. Upon a successful page table hit, the address translation information can be cached in TLB 418 for future use. In some examples, page table 420 can reside in NVM 402 (in NVMsys) or in other system memory in the computing system. In other examples, at least a portion of page table 420 can reside in MMU 416, such as in a memory array, registers, or the like.

The NVM domain logic 410 provides the memory domain map from the domain map 408 to the MMU 416 of the memory domain-valid NVMsys 404 block addresses, which are used for the creation and management of the page table 420 and the TLB 418. When a change is made to the memory domain map, the MMU 416 alters the page table 420 and the TLB 418 accordingly. As such, while data is not being moved from its physical location in NVM 402, from the perspective of the MMU 416 the data transfer has occurred. Such a "virtual transfer" provides an additional benefit with respect to modified data. In the traditional case of a system using volatile system memory, when power is lost to a system, either through an intentional or an unintentional power interruption, modified or "dirty" data is lost unless it is written back to storage before the data bus loses power. This is of particular concern for unintentional power loss, as the system must use very limited power to write the data to storage. Such is even a concern with systems utilizing NVM as system memory, because such systems often render the data in system memory unreadable upon system reset. In the present case, however, modified NVMsys 404 data is already located at its NVMstor 406 block address, so any modifications to the data are present regardless of the domain in which the associated address is valid.

In some cases, the domain map and the page table can be incorporated into a common table, or in other words, the PTEs in the page table can include both NVMsys and NVMstor block addresses, with a domain attribute bit or other domain identifier to signify which addresses are currently in the memory domain. A NVM block address can thus be transferred from one domain to the other by flipping the domain attribute bit in the corresponding PTE for that address.

Figure 5:
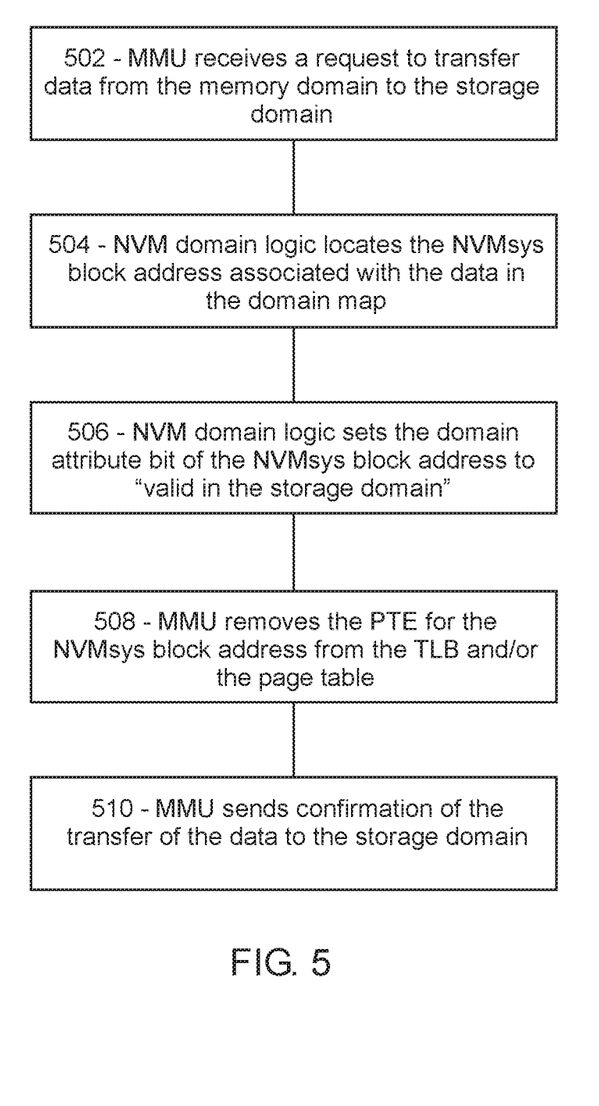
FIG. 5 illustrates a method flow for transferring data from a memory domain to a storage domain in accordance with an example embodiment.

FIG. 5 shows an exemplary method of transferring data from the memory domain to the storage domain. The method can include 502 receiving, in some cases by the MMU, a request to transfer data from the memory domain to the storage domain, 504 the NVM domain logic locates the NVMsys block address associated with the data in the domain map, and 506 the NVM domain logic sets the domain attribute bit of the NVMsys block address to valid in the storage domain, which is now a NVMstor block address. 508 the MMU removes the PTE for the NVMsys block address (now a NVMstor block address) from the TLB, if present, and from the page table, thus effectively transferring the data from the system domain to the storage domain without physically moving the data. In response to the transfer, 510 the MMU sends a confirmation of the transfer of the data to the storage domain.

Figure 6:
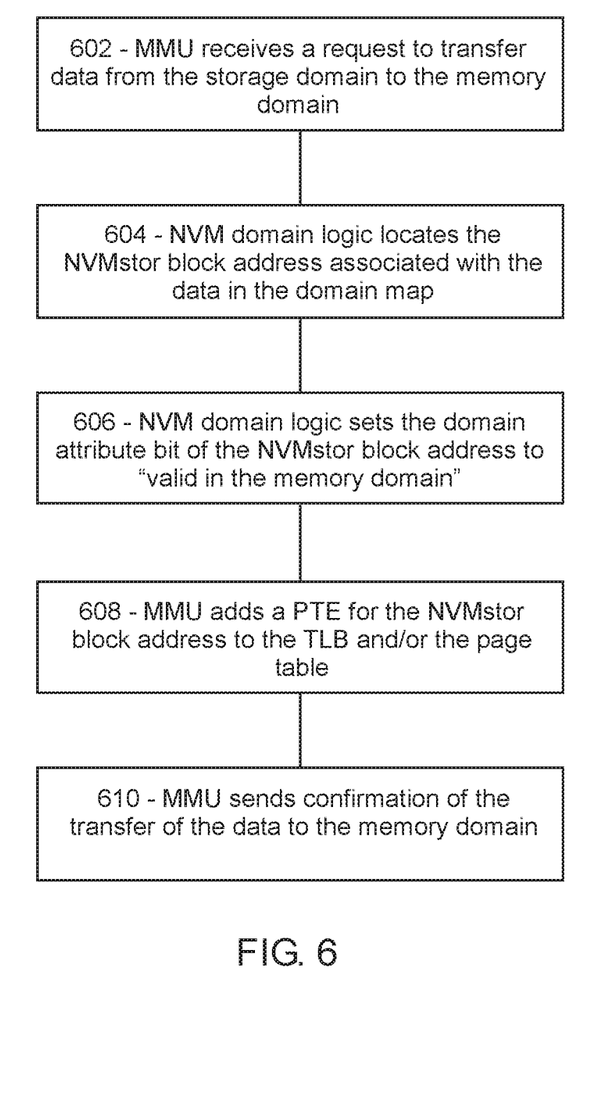
FIG. 6 illustrates a method flow for transferring data from a storage domain to a memory domain in accordance with an example embodiment.

FIG. 6 shows an exemplary method of transferring data from the storage domain to the memory domain. The method can include 602 receiving, in some cases by the MMU, a request to transfer data from the storage domain to the memory domain, 604 the NVM domain logic locates the NVMstor block address associated with the data in the domain map, and 606 the NVM domain logic sets the domain attribute bit of the NVMstor block address to valid in the memory domain, which is now a NVMsys block address. 608 the MMU adds a PTE for the NVMstor block address (now a NVMsys block address) to the page table, and in some cases to the TLB, thus effectively transferring the data from the storage domain to the system domain without physically moving the data. In response to the transfer, 610 the MMU sends a confirmation of the transfer of the data to the memory domain.

Figure 7:
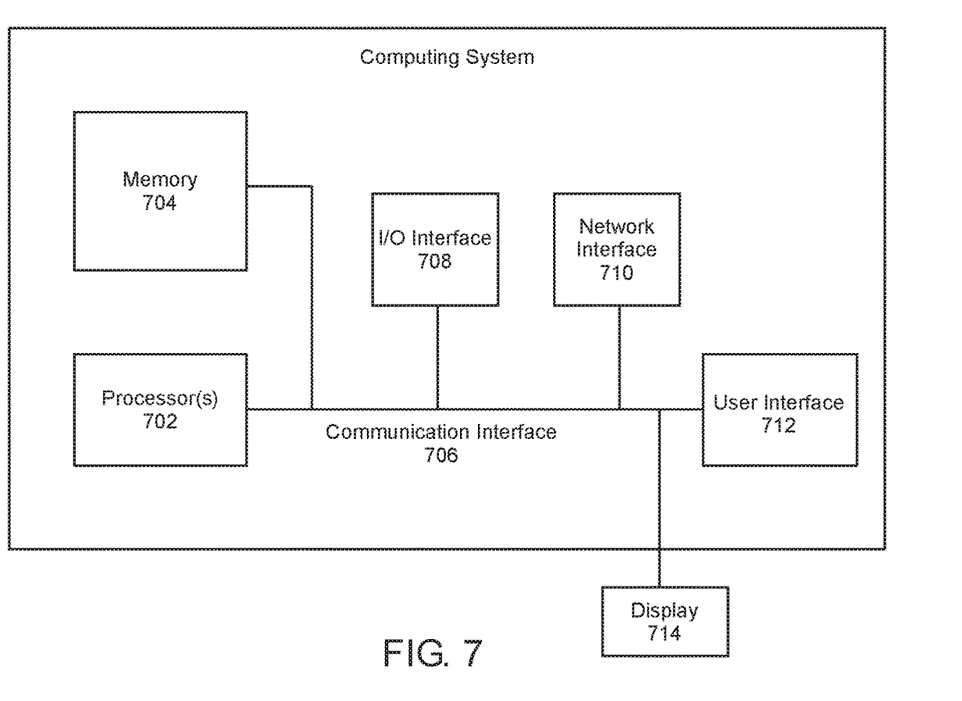
FIG. 7 illustrates a block diagram of a computing system in accordance with an example embodiment.

As another example, FIG. 7 illustrates a generalized example of a computing system 700 that can incorporate the present technology. While any type or configuration of device or computing system is contemplated to be within the present scope, non-limiting examples can include node computing systems, system-on-chip (SoC) systems, system-in-package (SiP) systems, system-on-package (SoP) systems, server systems, networking systems, high capacity computing systems, data centers, laptop computers, tablet computers, desktop computers, smart phones, and the like.

The computing system 700 can include one or more processors 702 in communication with a memory 704. The memory 704 can include any device, combination of devices, circuitry, or the like, that is capable of storing, accessing, organizing, and/or retrieving data. Additionally, a communication interface 706, such as a local communication interface, for example, provides connectivity between the various components of the system. The communication interface 706 can vary widely depending on the processor, chipset, and memory architecture of the system. For example, the communication interface 706 can be a local data bus, command/address bus, package interface, fabric, or the like.

The computing system can also include an I/O (input/output) interface 708 for controlling the I/O functions of the system, as well as for I/O connectivity to devices outside of the computing system. A network interface 710 can also be included for network connectivity. The network interface 710 can control network communications both within the system and outside of the system, and can include a wired interface, a wireless interface, a Bluetooth interface, optical interface, communication fabric, and the like, including appropriate combinations thereof. Furthermore, the computing system can additionally include a user interface 712, a display device 714, as well as various other components that would be beneficial for such a system.

The processor 702 can be a single processor or multiple processors, including a single core or multiple processor cores, and the memory can be a single memory or multiple memories. The local communication interface 706 can be used as a pathway to facilitate communication between any of a single processor or processor cores, multiple processors or processor cores, a single memory, multiple memories, the various interfaces, and the like, in any useful combination. In some examples, the communication interface 706 can be a separate interface between the processor 702 and one or more other components of the system, such as, for example, the memory 704. The memory 704 can include system and storage memory as described herein, as well as additional volatile or NVM.

Various techniques, or certain aspects or portions thereof, can take the form of program code (i.e., instructions) embodied in tangible media, such as CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and NVM and/or storage elements), at least one input device, and at least one output device. The volatile and non-volatile memory and/or storage elements can be a RAM, EPROM, flash drive, optical drive, magnetic hard drive, solid state drive, or other medium for storing electronic data.

EXAMPLES

The following examples pertain to specific embodiments and point out specific features, elements, or steps that can be used or otherwise combined in achieving such embodiments.

In one example, there is provided a memory addressing device, comprising a nonvolatile memory (NVM) domain logic to be communicatively coupled to a NVM to include a plurality of NVM block addresses comprising a set of system memory (NVMsys) block addresses valid in a memory domain and mapped to a system memory address space, and a set of storage memory (NVMstor) block addresses valid in a storage domain, the NVM logic to manage a domain map of entries for each of the NVMsys block addresses and each of the NVMstor block addresses and, in response to a request to move data from the memory domain to the storage domain, alter the associated NVMsys block address entry from valid in the memory domain to valid in the storage domain, without moving the data, or, in response a request to move data from the storage domain to the memory domain, alter the associated NVMstor block address entry from valid in the storage domain to valid in the memory domain, without moving the data.

In one example, the memory addressing device can further comprise a system memory controller coupled to the NVM, the system memory controller to control system memory operations on NVMsys data valid in the memory domain, and a storage memory controller coupled to the NVM, the storage memory controller to control storage memory operations on NVMstor data valid in the storage domain.

In one example of the device, each NVM block address entry in the domain map includes a domain status bit to indicate a domain status of the associated NVM block address of either a NVMsys block address valid in the memory domain or a NVMstor block address valid in the storage domain;

In one example of the device, to move data from the memory domain to the storage domain, the NVM domain logic is further to alter the NVMsys block address entry associated with the data from valid in the memory domain to valid in the storage domain by flipping the domain status bit to alter the domain status of the NVMsys block address to a NVMstor block address.

In one example of the device, after altering the domain status of the NVMsys block address to the NVMstor block address, the NVM domain logic is further to send a confirmation to an originator of the instruction to move the data.

In one example of the device, to move data from the storage domain to the memory domain, the NVM domain logic is further to alter the NVMstor block address entry associated with the data from valid in the storage domain to valid in the memory domain by flipping the domain status bit to alter the domain status of the NVMstor block address to a NVMsys block address.

In one example of the device, after altering the domain status of the NVMstor block address to the NVMsys block address, the NVM domain logic is further to send a confirmation to an originator of the instruction to move data.

In one example of the device, each entry in the domain map comprises a logical block address (LBA), a LBA offset, and the domain status bit.

In one example, the memory addressing device can further comprise a memory management unit (MMU) including the NVM domain logic and at least a portion of the domain map.

In one example of the device, the MMU further comprises at least a portion of a page table to map a set of virtual memory addresses to the set of NVMsys block addresses.

In one example of the device, the page table and the domain map comprise a common table.

In one example, the memory addressing device can further comprise the NVM.

In one example of the device, the NVM comprises a memory type selected from the group consisting of flash-based flash memory, phase change memory (PCM), three-dimensional (3D) cross-point memory, non-volatile dual in-line memory module (NVDIMM)-based memory, resistive RAM (ReRAM), conductive-bridging RAM (CBRAM), silicon-oxide-nitride-oxide-silicon (SONOS) memory, ferroelectric RAM (FeRAM), ferroelectric transistor RAM (Fe-TRAM), anti-ferroelectric memory, ferroelectric polymer memory, magnetoresistive RAM (MRAM), write-in-place non-volatile MRAM (NVMRAM), spin-transfer torque (STT) memory, spin-orbit torque (SOT) memory, nanowire memory, nanotube RAM (NRAM), spintronic magnetic junction-based memory, magnetic tunneling junction (MTJ)-based memory, and domain wall (DW)-based memory.

In one example of the device, the NVM comprises 3D cross-point memory.

In one example of the device, the NVM comprises 3D cross-point-based NVDIMM memory.

In one example, there is provided a computing system, comprising a processor, a nonvolatile memory (NVM) coupled to the processor and to include a plurality of NVM block addresses comprising a set of system memory (NVMsys) addresses valid in a memory domain and mapped to a system address space, and a set of storage memory (NVMstor) addresses valid in a storage domain, and a NVM domain logic coupled to the processor. The NVM domain logic is to manage a domain map of entries for each of the NVMsys block addresses and each of the NVMstor block addresses and, in response to a request from a host to move data from the memory domain to the storage domain, alter the associated NVMsys block address entry from valid in the memory domain to valid in the storage domain, without moving the data, or, in response to a request from a host to move data from the storage domain to the memory domain, alter the associated NVMstor block address entry from valid in the storage domain to valid in the memory domain, without moving the data.

In one example, the system further comprises a system memory controller coupled to the processor and the NVM, the system memory controller to control system memory operations on NVMsys data valid in the memory domain, and a storage memory controller coupled to the processor and the NVM, the storage memory controller to control storage memory operations on NVMstor data valid in the storage domain.

In one example of the system, each NVM block address entry includes a domain status bit to indicate a domain status of the associated NVM block address of either a NVMsys block address valid in the memory domain or a NVMstor block address valid in the storage domain.

In one example of the system, to move data from the memory domain to the storage domain, the NVM domain logic is further to alter the NVMsys block address entry associated with the data from valid in the memory domain to valid in the storage domain by flipping the domain status bit to alter the domain status of the NVMsys block address to a NVMstor block address.

In one example of the system, after altering the domain status of the NVMsys block address to the NVMstor block address, the NVM domain logic is further to send a confirmation to the host.

In one example of the system, to move data from the storage domain to the memory domain, the NVM domain logic is further to alter the NVMstor block address entry associated with the data from valid in the storage domain to valid in the memory domain by flipping the domain status bit to alter the domain status of the NVMstor block address to a NVMsys block address.

In one example of the system, after altering the domain status of the NVMstor block address to the NVMsys block address, the NVM domain logic is further to send a confirmation to the host.

In one example of the system, each entry in the domain map comprises a logical block address (LBA), a LBA offset, and the domain status bit.

In one example, the system further comprises a memory management unit (MMU) coupled to the processor, including the NVM domain logic and at least a portion of the domain map. In one example, the system further comprises a storage device coupled to the processor to store instructions that, when executed, cause the processor to allocate virtual memory within the system address space, and a page table functionally coupled to the MMU to store entries of a set of virtual memory addresses mapped to the NVMsys block addresses.

In one example of the system, to move data from the memory domain to the storage domain, the NVM domain logic is further to alter the NVMsys block address entry associated with the data from valid in the memory domain to valid in the storage domain by flipping the domain status bit in the domain map to alter the domain status of the NVMsys block address to a NVMstor block address, and update the page table to remove a reference to the NVMsys block address.

In one example of the system, to move data from the storage domain to the memory domain, the NVM domain logic is further to alter the NVMstor block address entry associated with the data from valid in the storage domain to valid in the memory domain by flipping the domain status bit in the domain map to alter the domain status of the NVMstor block address to a NVMsys block address, and update the page table to add a reference to the NVMsys block address.

In one example of the system, the page table and the NVM map table comprise a common table.

In one example of the system, the NVM comprises a memory type selected from the group consisting of flash-based flash memory, phase change memory (PCM), three-dimensional (3D) cross-point memory, non-volatile dual in-line memory module (NVDIMM)-based memory, resistive RAM (ReRAM), conductive-bridging RAM (CBRAM), silicon-oxide-nitride-oxide-silicon (SONOS) memory, ferroelectric RAM (FeRAM), ferroelectric transistor RAM (Fe-TRAM), anti-ferroelectric memory, ferroelectric polymer memory, magnetoresistive RAM (MRAM), write-in-place non-volatile MRAM (NVMRAM), spin-transfer torque (STT) memory, spin-orbit torque (SOT) memory, nanowire memory, nanotube RAM (NRAM), spintronic magnetic junction-based memory, magnetic tunneling junction (MTJ)-based memory, and domain wall (DW)-based memory.

In one example of the system, the NVM comprises 3D cross-point memory.

In one example of the system, the NVM comprises 3D cross-point-based NVDIMM memory.

In one example of the system, the host is the processor.

In one example of the system, the host is a direct memory access (DMA) controller.

In one example, there is provided a method for virtually moving data between memory and storage domains, comprising managing, with a nonvolatile memory (NVM) domain logic, a domain map including a memory domain of a plurality of system memory (NVMsys) block addresses valid in the memory domain and a storage domain of a plurality of storage memory (NVMstor) block addresses valid in the storage domain, and altering, in response to a request to move data from the memory domain to the storage domain, the associated NVMsys block address entry from valid in the memory domain to valid in the storage domain, without moving the data, or altering, in response a request to move data from the storage domain to the memory domain, the associated NVMstor block address entry from valid in the storage domain to valid in the memory domain, without moving the data.

In one example, the method further comprises, in response to a request to move data from the memory domain to the storage domain, locating, with the NVM domain logic, the associated NVMsys block address entry in the domain map, and switching, with the NVM domain logic, the associated NVMsys block address entry that is valid in the memory domain to a NVMstor block address that is valid in the storage domain.

In one example, the method further comprises locating, with a memory management unit (MMU), the NVMstor block address in a translation lookaside buffer (TLB). removing, if found in the TLB, the NVMstor block address from the TLB, and removing, with the MMU, the NVMstor block address from a page table.

In one example, the method further comprises, in response to a request to move data from the storage domain to the memory domain, locating, with the NVM domain logic, the associated NVMstor block address entry in the domain map, and switching, with the NVM domain logic, the associated NVMstor block address entry that is valid in the storage domain to a NVMsys block address that is valid in the memory domain.

In one example, the method further comprises adding, with a memory management unit (MMU), the NVMsys block address to a page table.

In one example, the method further comprises adding, with the MMU, the NVMsys block address to a translation lookaside buffer (TLB).

What is claimed is:

1. A memory addressing device, comprising:
   a nonvolatile memory (NVM) domain logic to be communicatively coupled to a NVM to include a plurality of NVM block addresses comprising a set of system memory (NVMsys) block addresses valid in a memory domain and mapped to a system memory address space, and a set of storage memory (NVMstor) block addresses valid in a storage domain, the NVM logic to:
   manage a domain map of NVM block address entries associated with the plurality of NVM block addresses including an entry for each of the set of NVMsys block addresses and for each of the set of NVMstor block addresses; and
   in response to a request to move data from the memory domain to the storage domain, alter the NVMsys block address entry associated with the data from valid in the memory domain to valid in the storage domain, without moving the data; or
   in response a request to move data from the storage domain to the memory domain, alter the NVMstor block address entry associated with the data from valid in the storage domain to valid in the memory domain, without moving the data.

2. The device of claim 1, further comprising:
   a system memory controller to be communicatively coupled to the NVM, the system memory controller to control system memory operations on NVMsys data valid in the memory domain; and
   a storage memory controller to be communicatively coupled to the NVM, the storage memory controller to control storage memory operations on NVMstor data valid in the storage domain.

3. The device of claim 1, wherein each NVM block address entry in the domain map includes a domain status bit to indicate a domain status of the associated NVM block address of either a NVMsys block address valid in the memory domain or a NVMstor block address valid in the storage domain.

4. The device of claim 3, wherein:
to move data from the memory domain to the storage domain, the NVM domain logic is further to alter the NVMsys block address entry associated with the data from valid in the memory domain to valid in the storage domain by flipping the associated domain status bit to alter the domain status of the NVMsys block address associated with the data to a NVMstor block address; and
to move data from the storage domain to the memory domain, the NVM domain logic is further to alter the NVMstor block address entry associated with the data from valid in the storage domain to valid in the memory domain by flipping the associated domain status bit to alter the domain status of the NVMstor block address associated with the data to a NVMsys block address.

5. The device of claim 1, further comprising a memory management unit (MMU) including:
the NVM domain logic; and
at least a portion of the domain map.

6. The device of claim 5, wherein the MMU further comprises at least a portion of a page table to map a set of virtual memory addresses to the set of NVMsys block addresses.

7. The device of claim 6, wherein the page table and the domain map comprise a common table.

8. The device of claim 1, further comprising the NVM.

9. The device of claim 8, wherein the NVM comprises 3D cross-point memory.

10. A computing system, comprising:
a processor;
a nonvolatile memory (NVM) coupled to the processor and to include a plurality of NVM block addresses comprising a set of system memory (NVMsys) addresses valid in a memory domain and mapped to a system address space, and a set of storage memory (NVMstor) addresses valid in a storage domain; and
a NVM domain logic coupled to the processor to:
manage a domain map of NVM block address entries associated with the plurality of NVM block addresses including an entry for each of the set of NVMsys block addresses and for each of the set of NVMstor block addresses; and
in response to a request from a host to move data from the memory domain to the storage domain, alter the NVMsys block address entry associated with the data from valid in the memory domain to valid in the storage domain, without moving the data; or
in response to a request from a host to move data from the storage domain to the memory domain, alter the NVMstor block address entry associated with the data from valid in the storage domain to valid in the memory domain, without moving the data.

11. The system of claim 10, further comprising:
a system memory controller coupled to the processor and the NVM, the system memory controller to control system memory operations on NVMsys data valid in the memory domain; and
a storage memory controller coupled to the processor and the NVM, the storage memory controller to control storage memory operations on NVMstor data valid in the storage domain.

12. The system of claim 10, wherein each NVM block address entry includes a domain status bit to indicate a domain status of the associated NVM block address of either a NVMsys block address valid in the memory domain or a NVMstor block address valid in the storage domain.

13. The system of claim 12, wherein:
to move data from the memory domain to the storage domain, the NVM domain logic is further to alter the NVMsys block address entry associated with the data from valid in the memory domain to valid in the storage domain by flipping the associated domain status bit to alter the domain status of the NVMsys block address associated with the data to a NVMstor block address; and
to move data from the storage domain to the memory domain, the NVM domain logic is further to alter the NVMstor block address entry associated with the data from valid in the storage domain to valid in the memory domain by flipping the associated domain status bit to alter the domain status of the NVMstor block address associated with the data to a NVMsys block address.

14. The system of claim 10, further comprising a memory management unit (MMU) coupled to the processor, including:
the NVM domain logic; and
at least a portion of the domain map.

15. The system of claim 14, further comprising:
a storage device coupled to the processor to store instructions that, when executed, cause the processor to allocate virtual memory within the system address space; and
a page table functionally coupled to the MMU to store entries of a set of virtual memory addresses mapped to the NVMsys block addresses.

16. The system of claim 15, wherein:
to move data from the memory domain to the storage domain, the NVM domain logic is further to:
alter the NVMsys block address entry associated with the data from valid in the memory domain to valid in the storage domain by flipping an associated domain status bit in the domain map to alter the domain status of the NVMsys block address associated with the data to a NVMstor block address; and
update the page table to remove the NVMsys block address entry;
and
to move data from the storage domain to the memory domain, the NVM domain logic is further to:
alter the NVMstor block address entry associated with the data from valid in the storage domain to valid in the memory domain by flipping an associated domain status bit in the domain map to alter the domain status of the NVMstor block address associated with the data to a NVMsys block address; and
update the page table to add an entry to the NVMsys block address.

17. The system of claim 15, wherein the page table and the NVM map table comprise a common table.

18. The system of claim 10, wherein the NVM comprises 3D cross-point memory.

19. The system of claim 10, wherein the host is the processor.

20. The system of claim 10, wherein the host is a direct memory access (DMA) controller.

21. A method for virtually moving data between memory and storage domains, comprising:
managing, with a nonvolatile memory (NVM) domain logic, a domain map of NVM block address entries including a memory domain of a plurality of system memory (NVMsys) block addresses valid in the memory domain and a storage domain of a plurality of storage memory (NVMstor) block addresses valid in the storage domain; and altering, in response to a request to move data from the memory domain to the storage domain, the NVMsys block address entry associated with the data from valid in the memory domain to valid in the storage domain, without moving the data; or altering, in response a request to move data from the storage domain to the memory domain, the NVMstor block address entry associated with the data from valid in the storage domain to valid in the memory domain, without moving the data.

22. The method of claim 21, wherein, in response to a request to move data from the memory domain to the storage domain, the method further comprises:

locating, with the NVM domain logic, the NVMsys block address entry associated with the data in the domain map; and switching, with the NVM domain logic, the NVMsys block address entry associated with the data that is valid in the memory domain to a NVMstor block address that is valid in the storage domain.

23. The method of claim 22, further comprising:

locating, with a memory management unit (MMU), the NVMsys block address associated with the data in a translation lookaside buffer (TLB);

removing, if found in the TLB, the NVMsys block address associated with the data from the TLB; and removing, with the MMU, the NVMsys block address associated with the data from a page table.

24. The method of claim 21, wherein, in response to a request to move data from the storage domain to the memory domain, the method further comprises:

locating, with the NVM domain logic, the NVMstor block address entry associated with the data in the domain map; and switching, with the NVM domain logic, the NVMstor block address entry associated with the data that is valid in the storage domain to a NVMsys block address that is valid in the memory domain.

25. The method of claim 24, further comprising:

adding, with a memory management unit (MMU), an entry to the NVMsys block address associated with the data in a page table; and adding, with the MMU, an entry to the NVMsys block address associated with the data in a translation lookaside buffer (TLB).

* * * * *